Nov. 8, 1927.

G. A. PETTIT 1,648,862

FILLER NECK FOR LOCOMOTIVE ROD CUPS

Filed June 10, 1926

WITNESSES
W. A. Williams

INVENTOR
George A. Pettit.
BY
ATTORNEYS

Patented Nov. 8, 1927.

1,648,862

UNITED STATES PATENT OFFICE.

GEORGE A. PETTIT, OF NEW ORLEANS, LOUISIANA.

FILLER NECK FOR LOCOMOTIVE ROD CUPS.

Application filed June 10, 1926. Serial No. 115,136.

My invention relates to improvements in filler necks for lubricant receptacles, such as the rod cups that are used on locomotives, and it consists in the combinations, constructions and arrangements herein described and claimed.

More specifically described, the present invention contemplates the provision of an improvement over the filler neck for locomotive rod cups that is disclosed in Patent #1,490,848 granted to me April 15, 1924, said improvement comprising a filler neck having novel means for limiting the movement of a ball check valve that is used therein away from its seat and for guiding the ball check valve in its movement under pressure toward its seat and also for detachably connecting the filler neck with the nozzle of a suitable lubricant gun.

Figure 1:
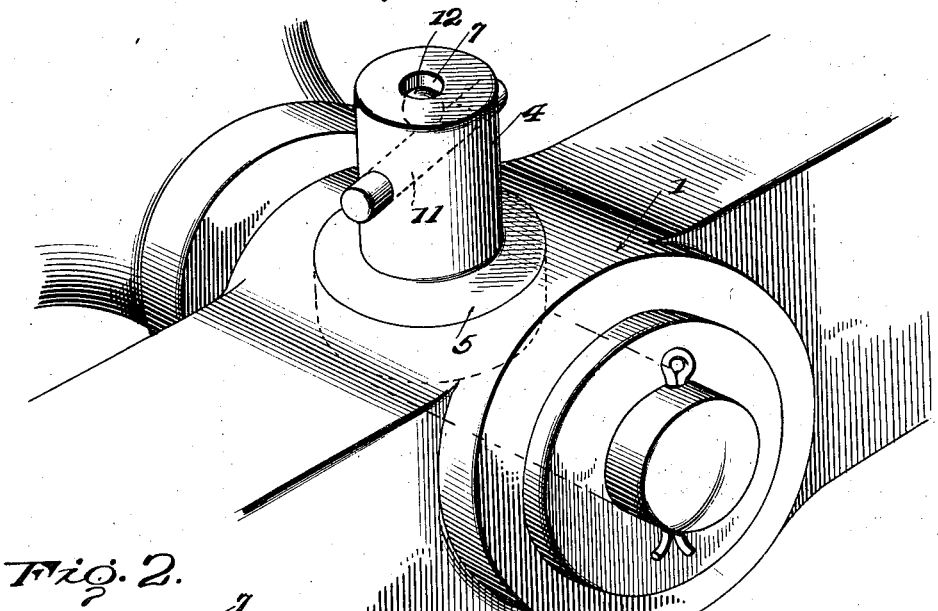
Figure 2:
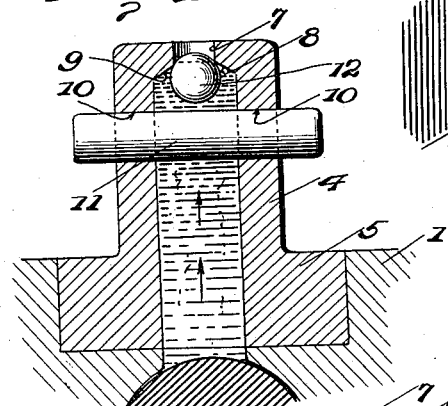
Figure 4:
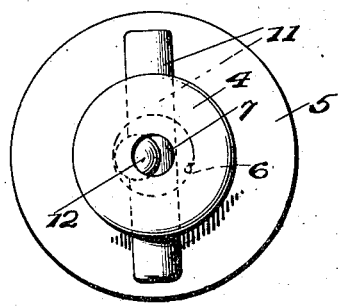
Figure 3:
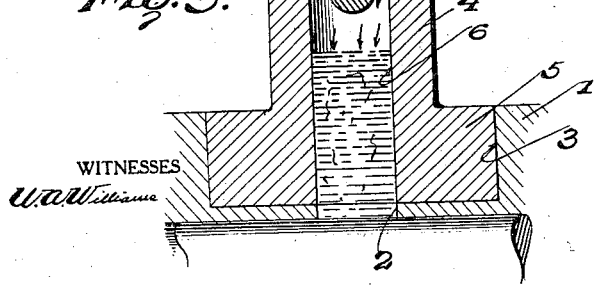

Other objects and advantages of the invention will be apparent from the following description, considered in conjunction with the accompanying drawings, in which Figure 1 is a perspective view of a filler neck embodying the present invention applied to a rod cup such as is used on a locomotive, Figure 2 is a fragmentary vertical section through a portion of the rod cup and through the filler neck as it appears after it has been filled with a suitable lubricant, Figure 3 is a fragmentary vertical section through a portion of the rod cup and through the filler neck as it appears before it has been completely filled with the lubricant, Figure 3 being taken along a plane extending at right angles with Figure 2, and Figure 4 is a plan view of the improved filler neck with the ball check valve that is used therein in open position.

In Figure 1, the numeral 1 designates a rod cup having a vertical inlet opening 2 in its upper wall formed with a counterbore 3 at its upper end. The improved filler neck comprises a tubular body 4 having an externally enlarged lower end portion 5 adapted to fit in the counterbore 3 so that the bore 6 of the filler neck will register with the inlet opening 2 of the rod cup. The enlarged lower end portion 5 of the body of the filler neck may be secured in place in the counterbore 3 in any suitable known manner, no means therefore being shown in the drawings. The bore 6 of the filler neck body is reduced at the upper end of the filler neck body at 7, thus producing a circular valve seat at 8 and an annular shoulder at 9, said shoulder being beveled outwardly and downwardly from the valve seat 8 to the juncture of the shoulder 9 with the inner wall of the relatively large main portion of the bore 6. This relatively large main portion of the bore 6 preferably is coextensive in cross sectional area with the inlet opening 2 in the upper wall of the rod cup. The tubular body of the filler neck is provided below the level of the lower and outer edge of the shoulder 9 with a pair of diametrically opposite radial openings 10. A hardened steel pin 11 of greater length than the outer diameter of the portion of the filler neck body in which the openings 10 are formed is driven through the openings 10 until the end portions of the pin 11 extend equal distances from the outer ends of the openings 10. The portions of the pin 11 that are received in the openings 10 have a driving fit with the walls of the openings 10 and are in fluid tight contact with the walls of the openings 10. The portion of the pin 11 that extends across the bore 6 serves as a stop and a rest for a ball check valve 12 which is loosely disposed in the upper end portion of the bore 6 between the pin 11 and the valve seat 8. It of course will be understood that the ball check valve 12 is placed in the upper end portion of the bore 6 before the body of the filler neck is secured in the counterbore 3 and before the pin 11 has been projected through the openings 10 to the position shown in the drawings. The diameter of the ball valve 12 is greater than that of the valve seat 8 and considerably less than the diameter of the bore 6 below the shoulder 9. The diameter of the portion of the pin 11 that extends across the bore 6 is less than the diameter of the bore but the sum of the diameters of the ball valve and the portion of the pin 11 that extends across the bore 6 is greater than the diameter of the bore 6 below the shoulder 9 so that the ball valve will be prevented from moving downward from the position shown in Figure 2 in the bore 6 past the pin 11. The diameter of the ball valve 12 is slightly less than the vertical distance between the plane of the valve seat 8 and the horizontal plane that is tangent to the highest portion of the pin 11 in the bore 6 so that limited movement of the ball valve vertically in the bore 6 between the pin 11 and the valve seat 8 is possible. The diameter of the ball valve 12 preferably is greater than the vertical distance between the plane of the lower edge of the shoulder 9 and the horizontal plane of the highest portion of the pin 11 in the bore 6 so that the ball valve will be in contact with the shoulder 9 at the same time that it is in contact with and rests upon the pin 11. The extending end portions of the pin 11 are adapted to serve as latch or retaining elements for engaging with slots in the nozzle of a suitable lubricant gun (not shown) so that the upper end portion of the filler neck is adapted for connection with the lubricant gun substantially in the manner of the male member of a bayonet joint.

From the foregoing description of the various parts of the device, the operation thereof may be readily understood. When a suitable lubricant gun has been attached to the filler neck in the manner just described, the operation of the lubricant gun will cause lubricant to enter the bore 6 of the filler neck through the reduced upper end portion 7 of the bore and past the ball valve 9 and the portion of the pin 11 that extends across the bore into the inlet opening 2 of the rod cup. The expansion of the lubricant in the bore of the filler neck after the filler neck has been filled will force the ball valve 9 upwardly from the position shown in Figures 3 and 4 to position to engage with the valve seat 8 and thus to close the upper end of the bore of the filler neck. The shoulder 9 will guide the ball valve upwardly from the position shown in Figures 3 and 4 to the position shown in Figure 2. It is intended that so-called "hard" grease or other plastic lubricant shall be used in the device and a sufficient quantity of such lubricant will remain in the upper portion of the bore of the filler neck above the pin 11 to retain the ball valve against the valve seat 8 until practically all the lubricant has passed from the portion of the bore 6 below the pin 11 into the inlet of the rod cup.

The device is simple in construction and can be filled easily and quickly.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. The combination with a tubular member having one end flanged inwardly to form an apertured valve seat, said flange having its inner wall splayed toward said aperture, a non-yielding support in said member, a valve in said member in constant contact with said wall and normally in contact with said support, said valve being movable from said support along said wall into valve closing position by back expansion only of compressed lubricant filling said neck.

2. The combination with a tubular member having one end thereof flanged inwardly to form an apertured valve seat, the wall of said flange being splayed toward the aperture of said seat, a pin extending diametrically across said member and having its ends projecting therethrough, a ball valve in constant contact with the said splayed wall and normally in contact with said pin, said valve being movable along said wall to close the aperture in said seat by back expansion only of compressed lubricant filling said neck.

GEORGE A. PETTIT.